United States Patent [19]

Stegall, Sr. et al.

[11] Patent Number: 5,269,911
[45] Date of Patent: Dec. 14, 1993

[54] WASTE TREATMENT SYSTEM

[75] Inventors: William A. Stegall, Sr., 30921 La Hwy. 16, Denham Springs, La. 70726; Marty Tittlebaum, Baton Rouge, La.

[73] Assignee: William A. Stegall, Sr., Denham Springs, La.

[21] Appl. No.: 874,057

[22] Filed: Apr. 24, 1992

[51] Int. Cl.⁵ .............................................. B01D 29/68
[52] U.S. Cl. ................................. 210/108; 210/109; 210/195.1; 210/202; 210/257.1; 210/411
[58] Field of Search .................. 210/97, 104, 109, 109, 210/194, 195.1, 202, 220, 258, 259, 411, 416.1, 521, 532.2, 170, 136

[56] References Cited

U.S. PATENT DOCUMENTS

| | | | |
|---|---|---|---|
| 3,724,664 | 4/1973 | Lemberger | 210/104 |
| 4,021,347 | 5/1977 | Teller et al. | 210/411 |
| 4,211,654 | 7/1980 | Weber et al. | 210/104 |
| 4,505,813 | 3/1985 | Graves | 210/411 |
| 4,664,795 | 5/1987 | Stegall et al. | 210/202 |
| 4,834,879 | 5/1989 | Stegall et al. | 210/205 |
| 4,986,905 | 1/1991 | White | 210/104 |
| 5,200,065 | 4/1993 | Sinclair et al. | 210/108 |

*Primary Examiner*—Joseph W. Drodge
*Attorney, Agent, or Firm*—Pravel, Hewitt, Kimball & Krieger

[57] ABSTRACT

A wastewater treatment system for domestic sewage uses a primary treatment vessel and a secondary vessel with a filtration unit therebetween. Continuous backwashing of the filtration unit occurs when a well pump is activated to empty the secondary vessel. A controlled portion of fluid discharged by the well pump backwashes the filter continuously as the secondary treatment vessel is emptied.

19 Claims, 2 Drawing Sheets

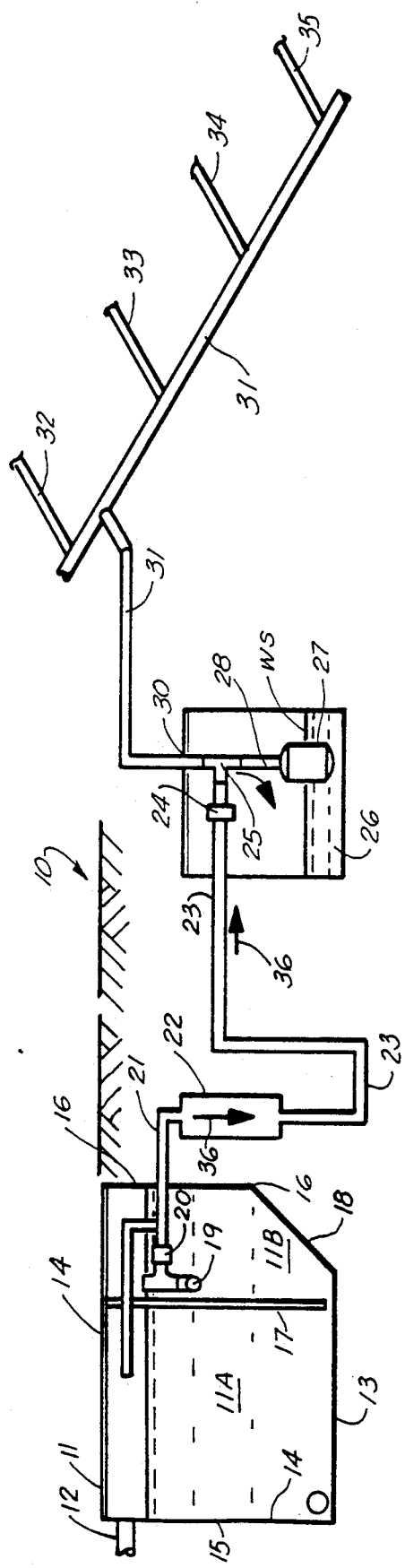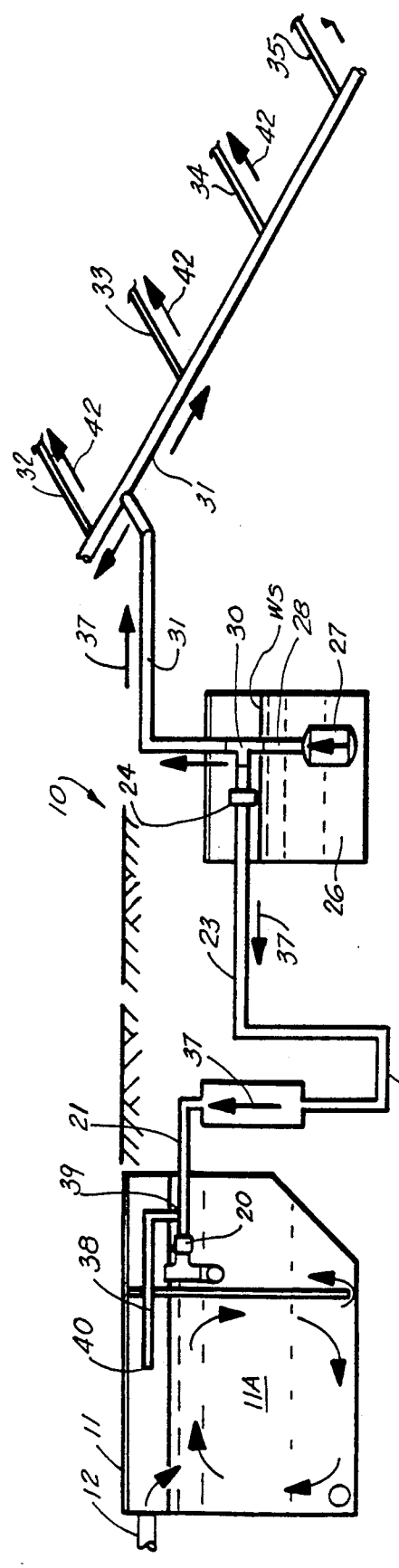

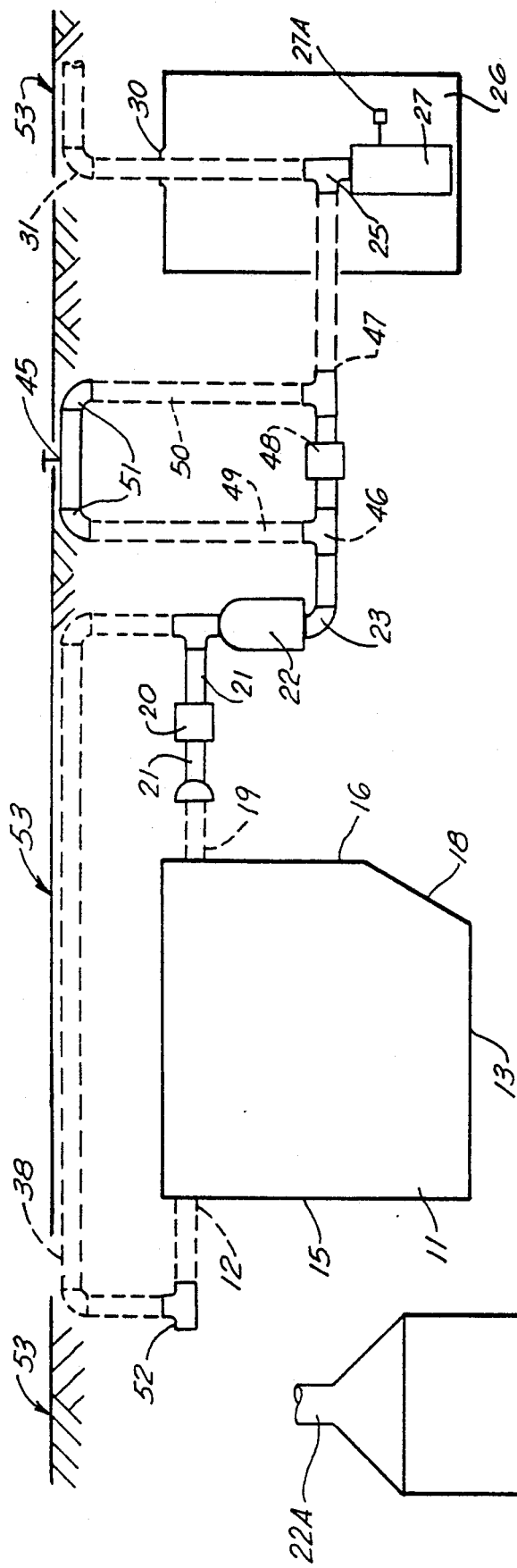
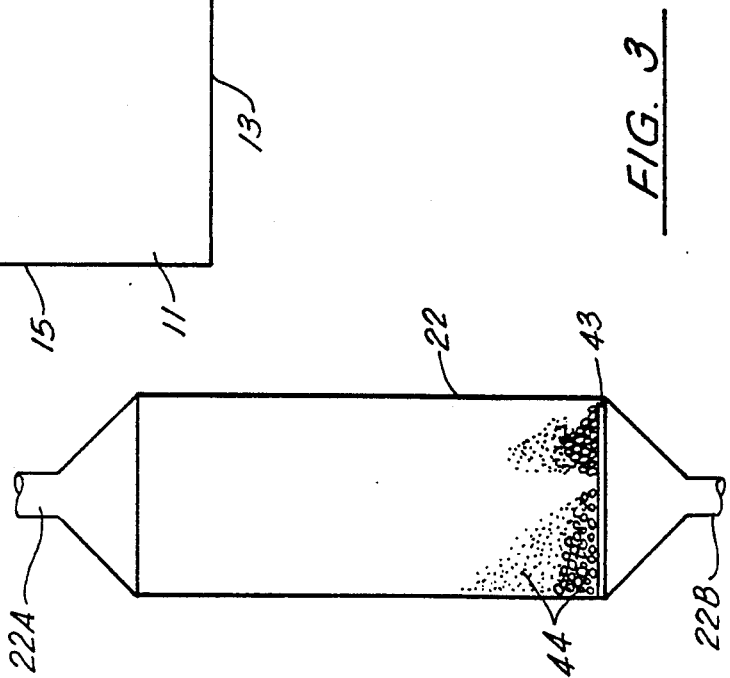
FIG. 4
FIG. 3

WASTE TREATMENT SYSTEM

BACKGROUND OF THE INVENTION

1. Field Of The Invention

The present invention relates to self-contained waste treatment systems and more particularly relates to an improved self-contained wastewater treatment for use in rural areas and in the treatment of waste from small buildings, homes, trailer parks, office buildings and the like wherein a primary treatment vessel continuously aerates and treats the wastewater product and the effluent passes through a filtration unit into a dosing vessel that cycles between empty and full flow conditions, with a pump in the dosing tank being activated when the dosing vessel reaches full position, and wherein a flow control device divides discharging flow from the pump into a first larger volume that is distributed through a discharge header system to the environment, and a smaller flow portion backwashes the filter, returning dirty backwash to the primary vessel.

2. General Background

It is desirable that wastewater be treated in a economical way utilizing as little energy as possible and as few moving parts as possible while removing a high percentage of solid material from the waste water stream and while lowering the total suspended solids (TSS) and bio-chemical oxygen demand (BOD) of the wastewater stream. It is desirable that a minimum of sludge removal would be required since sludge disposal presents an extra problem.

It would be desirable that a wastewater treatment apparatus produce a total homogenation of the fluids received from the waste stream in order that they be properly biodegraded. Wastewater entering the unit would normally be heterogeneous in nature, containing solid waste material as well as liquid wastewater.

In aerated treatment systems, a problem is faced in that a clogging of the aeration assembly which provides oxygen and mixing to the unit will cause a degeneration of the treatment process or in fact a total stoppage of air flow to the vessel, transferring the process from aerobic to anaerobic, thus removing most treatment capability. It would be desirable that the aeration unit or air diffuser be provided that minimizes or prevents clogging by solid material which may enter the unit.

In a small wastewater treatment system for use in treatment waste from single family dwellings, small businesses, apartments and the like, tertiary treatment is desirable so that underground disposal of effluent can be used such as under crops to eliminate or minimize environmentally adverse effects.

SUMMARY OF THE PRESENT INVENTION

The present invention provides an individual home type sewerage treatment system that affords an economical alternative for use in treating domestic wastewater on a day-to-day basis. The apparatus includes an extended aeration chamber, an activated sludge system which is capable of producing a clear, odorless effluent which meets applicable state and federal discharge standards (USEPA). An effluent filtration unit and subsurface disposal system are included in the treatment system. The extended aeration system is ideally suited for upgrading existing septic tank systems, in which case the septic tank continues to function as an anaerobic solids tank. The subsurface disposal system is capable of disposing of the high-quality, treated effluent into almost any soil condition or site topography.

In cases where surface discharge or the use of drain fields is not acceptable, the apparatus of the present invention offers a unique tertiary filtering system followed by subsurface discharge. The automatic backwash filtering system of the present invention is designed to provide tertiary treatment for treated wastewater prior to disposal through the subsurface disposal dripper lines.

Effluent from the clarifier portion of the apparatus aerobic treatment plant gravity flows through a flap check valve to the top of a sand filter. The treated wastewater then passes through the filtering media and a support plate by gravity flow. The filtered effluent flows through a second flap check valve and into a dosing chamber. The dosing chamber contains a well-type pump that can be activated by an electric, mercury control float switch. When the float switch activates the pump, a predetermined amount of filtered effluent is pumped from the dosing chamber. When the pressurized effluent leaves the dosing chamber it travels in two directions. The majority of the flow (for example 75%) is delivered to subsurface dripper lines for disposal. The remainder of the flow (for example 25%) is utilized to automatically backwash the sand filter.

The proportion of the flow used for backwashing is directed into a backwash line and through a manually controllable flow valve which is used to limit the amount of treated water being used for backwashing. This valve is desirably adjustable so that a preselected flow value can be used for backwashing the filter. The pressurized backwash water then flows upwardly through the media support plate and filtering media slightly expanding the sand bed and effectively cleaning any captured solids from the filter.

The backwash water and debris then exit the top of the filter and into a backwash line. The dirty water is then delivered to the influent end portion of the aerobic treatment system to be retreated. When the dosing well pump shuts off, backwashing stops and gravity flow through the filter resumes automatically.

The present invention provides an improved wastewater treatment system that includes a first treatment vessel having an interior area for containing a wastewater to be treated. The interior is divided into upstream and downstream portions with a transverse baffle plate. The vessel includes an influent for adding a wastewater stream to be treated to the interior area. The interior is aerated and an effluent line discharges clarified liquid from the vessel interior.

A filter (preferably a sand filter) is disposed downstream of the first treatment vessel for filtering clarified liquid that is discharged from the first treatment vessel.

A dosing vessel with an interior area contains liquid that has been filtered with the sand filter, the second vessel being positioned downstream of the filter and including a pump for emptying the second vessel when it is filled with filtered liquid.

A discharge flowline receives effluent from the second vessel and a drip header system receives flow therefrom, comprising a network of flowlines for distributing the filtered liquid over an expansive area such as a parcel of land.

A flow control device enables a partial volume of liquid exiting the dosing vessel to be transmitted to the filter in reverse flow direction for backwashing the filter. A backwash flowline positioned between the first treatment vessel and the filter recirculates dirty backwash from the filter to the first vessel and at a position upstream of the baffle.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein:

FIG. 1 is a sectional, elevation, schematic view of the preferred embodiment of the apparatus of the present invention illustrating normal operating position and prior to backwashing;

FIG. 2 is a sectional, elevation, schematic view of the preferred embodiment of the apparatus of the present invention illustrating a backwashing flow and treated effluent discharge configuration;

FIG. 3 is a sectional elevational fragmentary view of the sand filter portion of the preferred embodiment of the apparatus of the present invention; and FIG. 4 is a sectional, elevational view of the preferred embodiment of the apparatus of the present invention illustrating an alternate backwash flow volume control valve arrangement.

DETAILED DESCRIPTION OF THE PREFERRED EMBODIMENT

FIG. 1 illustrates the preferred embodiment of the apparatus of the present invention shown in a normal flow situation. Waste treatment system 10 includes a primary treatment vessel 11 having an influent flowline 12 for emptying waste flow into the vessel 11. The vessel 11 includes a bottom wall 13, top wall 15, front wall 14 and rear wall 16. A top can seal the vessel 11 so that vessel 11 can be installed underground.

Vertical baffle 17 divides the vessel 11 into first and second interior portions 11A, 11B. Inclined wall 18 extends between rear wall 16 and bottom wall 13 as shown in FIG. 1 an aerator 11C aerates fluid contained within the portion 11A of vessel 11.

An effluent header 19 includes multiple turns for existing flow and before the exiting flow enters effluent line 21, passing through check valve 20. It should be understood that the primary treatment vessel 11, effluent header 19, and baffle 17 are all shown in prior U.S. Pat. Nos. 4,664,795 issued May 12, 1987 and 4,834,879 issued May 30, 1989, each of which is incorporated herein by reference.

Effluent line 21 transmits treated fluid leaving primary treatment vessel 11 to filter 22 via filter inlet 22A. The filter 22 further cleanses flow that has been treated by the primary treatment vessel 11, removing small particulate matter from the wastewater stream being treated. Filter 22 is preferably a media type filter such as a sand filter. The sand filter (FIG. 3) has a transversely positioned media support plate 43 positioned at the lower end portion of filter 22, just above outlet 22B. On the top of the support plate is a coarse media such as gravel, two to three inches thick. On top of the gravel is a coarse grain sand such as size 610. This designation indicates that 90% of the sand falls between U.S. standard sieve size 6 and 10 (3.35 millimeters and 2.0 millimeters). The plate 43 is perforated using for example a plurality of one eighth inch diameter holes drilled therethrough for the passage of liquid from the filter 22 via outlet 22B and into flowline 23.

After traveling through filter 22 in the direction shown by arrow 36, flow enters effluent line 23 for filtered effluent. The filtered effluent line 23 empties via flow control orifice fitting 24 and tee fitting 25 into a second treatment vessel or dosing chamber 26. The dosing chamber 26 is provided with a well pump 27 that is activated with a commercially available float control device such as electric, mercury controlled float switch 27A for activating pump 27 when the fluid level reaches maximum water surface WS in dosing chamber 26. Flow control orifice fitting 24 can be a check valve with a small metered orifice in the center of the check valve wafer. In this manner, the wafer opens when normal flow is in the direction of arrow 36, from vessel 11 to filter 22, to valve 24 to sump 26.

Pump discharge line 28 communicates with tee fitting 25 and empties the contents of the dosing chamber 26 after the pump 27 has been activated as occurs when the water surface WS reaches its maximum level and sump 26 is full. When the pump 27 is activated, flow proceeds in the direction illustrated by arrows 37 in FIG. 2.

Discharging flow exits outlet 30 proceeds through discharge header 31 containing the majority of flow volume discharged by pump 27. However, a smaller amount of flow discharged by pump 27 enters line 23 as defined by flow control device 24. The flow control orifice of fitting 24 provides a selected orifice opening that defines how much flow passes the fitting 24 in a backwash situation. By selectively sizing the flow control orifice fitting 24, an exact selected amount of backwashing fluid flow can be transmitted by the pump 27 through the tee fitting 25 and into the line 23 as shown by the arrows 37. Thus, a continuous desired flow of backwashing fluid can be transmitted through the line 23 for backwashing the sand filter 22 in the direction of 37.

Dirty backwash flows into the effluent line 21 during that entire time period that the sump pump 27 is emptying the dosing chamber 26 via the tee fitting 25 and the flowlines 31 and 23.

Check valve 20 is positioned between effluent line 21 and effluent header 19. The check valve 20 allows flow in the direction of arrows 36 in FIG. 1, but disallows flow in the direction of arrows 37. Flow backwashing via sand filter 22 bypasses check valve 20 and reenters the upstream interior portion 11A of vessel 11 via bypass line 38, tee fitting 39, and elbow 42 until it discharges at discharge opening 40.

In the discharge and backwashing configuration of FIG. 2, arrows 41 indicate the direction of drip effluent. A plurality of drip lines 32-35 can be provided, each extending from the header 31. The drip lines 32-35 can be a sprinkler system for irrigation of a lawn, or garden or crops for example.

In FIG. 4, the apparatus 10 of the present invention is shown with optional adjustable flow control valve arrangement 45. In FIG. 4, the flow during backwashing proceeds from dosing chamber 26 via flowline 23 in the direction of arrow 37. A pair of tee fittings 46, 47 are placed in line 23 as shown in FIG. 4. Check valve 48 is positioned between tee fittings 46, 47. Each of the tee fittings 46, 47 communicates with a riser section 49, 50 respectively.

Horizontal flowline portion 51 extends between risers 49, 50 and contains control valve 45. In FIG. 4, the control valve 45 can be opened or closed at ground level 53. Control valve 45 provides a flow opening that defines the amount of backwash fluid flowing through line 23 in order to backwash the filter 22. In a backwash situation, the backwashing fluid from pump 27 and tee 25 closes check valve 48. Backwashing fluid first enters tee fitting 47, then riser 50, and then horizontal section 51 with control valve 45. After exiting control valve 45, backwashing fluid enters riser 49 and then tee fitting 46 before reentering line 23 upstream of check valve 48. This backwashing fluid then enters the outlet 22B fitting of filter 22 for backwashing as described with respect to the preferred embodiment.

Check valve 20 prevents backwashing fluid from entering the discharge side of aerobic chamber 11. The backwashing fluid travels via bypass line 38 to upstream fitting 52 and is reintroduced via influent flowline 12 to aerobic treatment vessel 11. The use of a pair of risers 49, 50 in combination with check valve 48 and control valve 45 allows the backwash flow level to be adjusted as needed at ground level 53. This is important because it allows a very high volume of backwashing fluid to be used from time to time in order to remove any clogging that might have accumulated in the filter as a part of routine maintenance. However, the flow value for backwashing fluid passing through valve 45 is typically set, as described above at twenty-five percent (25%) of total flow for example; total flow discharge via header 31 to tripper lines 32-35 would thus be seventy-five percent (75%) of total flow for example.

The following table lists the part numbers and part descriptions as used herein and in the drawings attached hereto.

PARTS LIST

| Part Number | Description |
| --- | --- |
| 10 | Waste treatment system |
| 11 | aerobic treatment vessel |
| 11A | vessel interior (larger) |
| 11B | vessel interior (smaller) |
| 11C | aerator |
| 12 | influent flowline |
| 13 | bottom wall |
| 14 | top wall |
| 15 | front wall |
| 16 | rear wall |
| 17 | baffle |
| 18 | inclined wall |
| 19 | effluent header |
| 20 | check valve |
| 21 | effluent line |
| 22 | filter |
| 22A | filter inlet |
| 22B | filter outlet |
| 23 | filtered effluent line |
| 24 | flow control orifice |
| 25 | tee fitting |
| 26 | dosing chamber |
| 27 | pump |
| 27A | float switch |
| 28 | pump discharge line |
| 29 | elbow fitting |
| 30 | outlet |
| 31 | header |
| 32 | drip line |
| 33 | drip line |
| 34 | drip line |
| 35 | drip line |
| 36 | flow arrow - filtration |
| 37 | flow arrows - backwashing |
| 38 | bypass line |
| 39 | tee fitting |
| 40 | discharge opening |
| 41 | arrows |
| 42 | elbow |
| 43 | media support plate |
| 44 | filter media |
| 45 | adjustable control valve |

-continued

PARTS LIST

| Part Number | Description |
| --- | --- |
| 46 | tee fitting |
| 47 | tee fitting |
| 48 | check valve |
| 49 | riser |
| 50 | riser |
| 51 | horizontal section |
| 52 | tee fitting |
| 53 | ground level |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A wastewater treatment system comprising:
   a) a first treatment vessel having an interior area for containing a wastewater product to be treated, the interior divided into upstream and downstream portions with a transverse baffle plate, and the vessel including an influent for adding a wastewater stream to be treated to the interior;
   b) means for aerating the interior of the vessel;
   c) an effluent line arranged for discharging clarified liquid from the vessel interior;
   d) a filter disposed downstream of the first treatment vessel and arranged for receiving flow from the effluent line, for filtering clarified liquid discharged from the first treatment vessel via the effluent line;
   e) a second treatment vessel with an interior area for containing liquid that has been filtered with the filter, the second vessel positioned downstream of the filter;
   f) a filter discharge line arranged for transmitting filtered liquid from the filter to the second treatment vessel;
   g) a pump arranged for emptying the second vessel when it is filled with filtered liquid;
   h) a pump discharge line that includes a first backwashing flow line means for transmitting backwashing fluid from the second vessel to the filter;
   i) a discharge flowline communicating with the pump discharge line for receiving effluent from the second vessel;
   j) a drip header system arranged for receiving effluent from the discharge flowline and comprising a network of flowlines for distributing filtered liquid over a selected expansive area;
   k) the pump discharge line including flow control means for enabling a partial volume of liquid flowing through the pump discharge line to be transmitted to the filter in reverse flow direction for backwashing the filer; and
   l) a second backwash flowline extending between the first treatment vessel and the effluent line and communicating with the effluent line at a position between the first vessel and the filter for recirculating dirty backwash from the filter to the first vessel at a position upstream of the baffle.

2. The apparatus of claim 1 wherein is further provided a check valve in the effluent line for preventing flow via the backwash line to the vessel effluent.

3. The apparatus of claim 1 wherein the effluent line comprises an effluent opening at the top portion of the first vessel.

4. The apparatus of claim 1 wherein the pump is a well pump contained within the second vessel interior.

5. The apparatus of claim 1 wherein there is further provided a level control means for activating the pump when the second vessel is full of filtered liquid.

6. The apparatus of claim 1 wherein the first vessel is a sealed vessel having a top wall that closes the top of the vessel so that the first vessel can be installed underground.

7. The apparatus of claim 1 wherein the second vessel is a sealed vessel having a top wall that closes the top of the vessel so that the first vessel can be installed underground.

8. The apparatus of claim 1 wherein the flow control means comprises in part a flow control orifice in the filtered effluent line, at a position between the filter and the pump.

9. The apparatus of claim 1 wherein the flow control means enables a preselected volume of liquid discharged by the pump from the second vessel to continuously backwash the filter each time the pump is activated to empty the second vessel.

10. A wastewater treatment system comprising:
  a) a first treatment vessel having an interior area for containing a wastewater product to be treated, and the vessel including an influent for adding a wastewater stream to be treated to the interior;
  b) means for aerating the interior of the vessel;
  c) an effluent line extending from the first treatment vessel and arranged for discharging clarified liquid from the vessel interior;
  d) a filter disposed downstream of the first treatment vessel and arranged for receiving flow from the effluent line for filtering clarified liquid that is discharged from the first treatment vessel via the effluent line;
  e) a second vessel with an interior area and arranged for containing liquid that has been filtered with the filter, the second vessel positioned downstream of the filter;
  f) a pump arranged for emptying effluent from the second vessel when it is filled with filtered liquid;
  g) a discharge flowline arranged for receiving effluent from the pump;
  h) a drip header system arranged for receiving effluent from the discharge flowline for distribution over a selected expansive area;
  i) flow control means for enabling a partial volume of liquid flowing through the discharge flowline to be transmitted to the filter in reverse flow direction for backwashing the filter; and
  j) a backwash flowline that extends between the effluent line and the first treatment vessel for recirculating dirty backwash from the filter to the first vessel.

11. The apparatus of claim 10 wherein the backwash flowline extends between the first vessel effluent and the first vessel and there is further provided a check valve in the effluent line for preventing flow via the backwash line to the vessel effluent.

12. The apparatus of claim 10 wherein the effluent line comprises an effluent opening at the top portion of the first vessel.

13. The apparatus of claim 10 wherein the pump is a well pump contained within the second vessel interior.

14. The apparatus of claim 10 wherein there is further provided a level control means for activating the pump when the second vessel is full of filtered liquid.

15. The apparatus of claim 10 wherein the first vessel is a sealed vessel having a top wall that closes the top of the vessel so that the first vessel can be installed underground.

16. The apparatus of claim 10 wherein the second vessel is a sealed vessel having a top wall that closes the top of the vessel so that the first vessel can be installed underground.

17. The apparatus of claim 10 wherein the flow control means comprises in part a flow control orifice in the filtered effluent line, at a position between the filter and the pump.

18. The apparatus of claim 10 wherein the pump is activated to empty the second vessel when the second vessel is substantially full.

19. The apparatus of claim 10 wherein the drip header comprises a network of a plurality of separated flowlines as part of the drip header system.

* * * * *